US011328864B2

(12) United States Patent
Huang et al.

(10) Patent No.: US 11,328,864 B2
(45) Date of Patent: May 10, 2022

(54) COMPOUND LINE FILTER

(71) Applicants: TOKIN CORPORATION, Sendai (JP); TOKIN ELECTRONICS (XIAMEN) CORPORATION, Fujian (CN)

(72) Inventors: Jie Huang, Fujian (CN); Michitaka Itaya, Sendai (JP); Kazuya Sugawara, Sendai (JP); Shota Misumi, Sendai (JP); Yuichirou Nagayama, Sendai (JP); Yukiyasu Yamauchi, Sendai (JP)

(73) Assignees: TOKIN CORPORATION, Miyagi (JP); TOKIN ELECTRONICS (XIAMEN) CORPORATION, Fujian (CN)

( * ) Notice: Subject to any disclaimer, the term of this patent is extended or adjusted under 35 U.S.C. 154(b) by 629 days.

(21) Appl. No.: 16/311,658

(22) PCT Filed: Jun. 22, 2017

(86) PCT No.: PCT/JP2017/022979
§ 371 (c)(1),
(2) Date: Dec. 19, 2018

(87) PCT Pub. No.: WO2017/222007
PCT Pub. Date: Dec. 28, 2017

(65) Prior Publication Data
US 2019/0198242 A1   Jun. 27, 2019

(30) Foreign Application Priority Data

Jun. 23, 2016 (JP) .............................. JP2016-124759
Jun. 24, 2016 (JP) .............................. JP2016-125887

(51) Int. Cl.
*H01F 27/32* (2006.01)
*H01F 41/06* (2016.01)
(Continued)

(52) U.S. Cl.
CPC ............. *H01F 41/06* (2013.01); *H01F 17/04* (2013.01); *H01F 27/28* (2013.01); *H01F 27/30* (2013.01);
(Continued)

(58) Field of Classification Search
CPC .......... H01F 41/06; H01F 27/32; H01F 37/00; H01F 27/30; H01F 17/04; H01F 27/28;
(Continued)

(56) References Cited

U.S. PATENT DOCUMENTS 2,558,293 A * 6/1951 Feinberg ................. H01F 38/10
                                                     315/138
2,992,386 A * 7/1961 Rosin ........................ G05F 3/06
                                                     323/308
(Continued)

FOREIGN PATENT DOCUMENTS

JP          01134909 A      5/1989
JP          H08339925 A     12/1996
(Continued)

OTHER PUBLICATIONS

European Office Action dated Jul. 8, 2020 issued in counterpart European Application No. 17815473.8.
(Continued)

*Primary Examiner* — Mang Tin Bik Lian
*Assistant Examiner* — Mangtin Lian
(74) *Attorney, Agent, or Firm* — Holtz, Holtz & Volek PC

(57) ABSTRACT

A compound line filter includes a bobbin, two coils and a magnetic core. The coils are wound on the bobbin in a state of being separated from each other in an axial direction. The magnetic core includes a closed magnetic path part and a secondary magnetic path part. The bobbin is attached to the closed magnetic path part. The secondary magnetic path part extends from the closed magnetic path part in a direction (Continued)

intersecting with the axial direction and is positioned between the coils in the axial direction. The bobbin includes at least one gear, and the gear is positioned between the coils in the axial direction.

11 Claims, 12 Drawing Sheets

(51) Int. Cl.
    *H01F 37/00* (2006.01)
    *H01F 27/30* (2006.01)
    *H01F 17/04* (2006.01)
    *H01F 27/28* (2006.01)

(52) U.S. Cl.
    CPC ........... *H01F 27/32* (2013.01); *H01F 27/325* (2013.01); *H01F 37/00* (2013.01)

(58) Field of Classification Search
    CPC .. H01F 27/325; H01F 2027/297; H01F 41/08; H01F 27/06; H01F 3/12; H01F 17/06; H01F 27/324; H01F 5/02; H01F 2005/022; Y02T 90/14; Y02T 10/70; Y02T 10/7072

See application file for complete search history.

(56) References Cited

U.S. PATENT DOCUMENTS

| | | | | |
|---|---|---|---|---|
| 3,022,458 A * | 2/1962 | Sola | ........................... | G05F 3/06 323/307 |
| 3,576,508 A * | 4/1971 | Liberman | ............. | H01F 27/324 336/165 |
| 4,924,200 A * | 5/1990 | Kitahara | ................... | H01F 5/04 336/192 |
| 5,266,916 A * | 11/1993 | Kijima | .................. | H01F 27/266 336/160 |
| 5,272,831 A * | 12/1993 | Willis | ..................... | A01M 1/04 336/165 |
| 5,635,891 A * | 6/1997 | Miyoshi | ................ | H01F 27/306 336/90 |
| 5,793,273 A * | 8/1998 | Yamaguchi | ............. | H01F 17/04 336/198 |
| 5,870,011 A * | 2/1999 | Mori | ..................... | H01F 27/027 336/90 |
| 7,474,187 B1 * | 1/2009 | Huang | .................. | H01F 27/027 336/65 |
| 2002/0057167 A1 * | 5/2002 | Yeh | ........................ | H01F 27/306 336/192 |
| 2005/0280481 A1 * | 12/2005 | Shih | ........................ | H01F 37/00 333/181 |
| 2008/0211615 A1 * | 9/2008 | Ushijima | ........... | H05B 41/2822 336/170 |
| 2010/0079231 A1 * | 4/2010 | Ger | ......................... | H01F 38/08 336/199 |
| 2010/0271164 A1 * | 10/2010 | Kitajima | ................... | H01F 3/10 336/221 |
| 2013/0154782 A1 * | 6/2013 | Won | ........................ | H01F 27/06 336/192 |
| 2015/0303792 A1 * | 10/2015 | Kim | ........................ | H01F 27/40 363/21.02 |

FOREIGN PATENT DOCUMENTS

| | | |
|---|---|---|
| JP | H10144546 A | 5/1998 |
| JP | 2000021658 A | 1/2000 |
| JP | 3074742 U | 1/2001 |
| JP | 3871152 B2 | 10/2006 |
| JP | 2007080951 A | 3/2007 |
| JP | 2008227229 A | 9/2008 |
| JP | 2010016234 A | 1/2010 |
| JP | 2011086842 A | 4/2011 |
| JP | 2014132602 A | 7/2014 |
| JP | 2014212163 A | 11/2014 |

OTHER PUBLICATIONS

Japanese Office Action (and English language translation thereof) dated Mar. 6, 2019 issued in Japanese Application No. 2016-124759.
Japanese Office Action (and English language translation thereof) dated Mar. 6, 2019 issued in Japanese Application No. 2016-125887.
International Search Report (ISR) dated Sep. 26, 2017 issued in International Application No. PCT/JP2017/022979.
Written Opinion dated Sep. 26, 2017 issued in International Application No. PCT/JP2017/022979.
Extended European Search Report (EESR) dated Nov. 21, 2019 issued in counterpart European Application No. 17815473.8.
Korean Office Action (and English language translation thereof) dated Jun. 17, 2021 issued in Korean Application No. 10-2019-7002072.
Korean Office Action (and English language translation thereof) dated Dec. 1, 2021, issued in counterpart Korean Application No. 10-2019-7002072.

* cited by examiner

COMPOUND LINE FILTER

TECHNICAL FIELD

This invention relates to a compound line filter, particularly to a compound line filter having a bobbin provided with a gear.

BACKGROUND ART

A line filter described in Patent Document 1 has a bobbin, a closed magnetic path core, a center core and a terminal mount. The bobbin is formed of two-split winding frames, and it is attached to a center magnetic leg of the closed magnetic path core. Moreover, the bobbin has two outer flange parts and a middle flange part positioned between them. One of the outer flange parts is provided with a gear, and giving an external force to the gear allows rotation of the bobbin about the central magnetic leg as an axis. Using this rotation, windings are wound on the bobbin. Two of the windings are disposed between two of the outer flange parts and the middle flange part, respectively. The center magnetic core is inserted into a through guide hole provided in the middle flange part. The line filter of Patent Document 1 has the center magnetic core and therefore serves as a compound line filter responsive to both modes of a common mode and a normal mode.

PRIOR ART DOCUMENTS

Patent Document(s)

Patent Document 1: JPA 2007-80951

SUMMARY OF INVENTION

Technical Problem

The gear of the line filter described in Patent Document 1 is provided outward of the outer flange parts in an axial direction and therefore it is a cause of hindrance to downsizing of the line filter.

It is an object of the invention to provide a compound line filter in which a size in an axial direction is reduced.

Solution to Problem

One aspect of the invention provides a compound line filter including a bobbin, two coils and a magnetic core. The coils are wound on the bobbin in a state of being separated from each other in an axial direction. The magnetic core includes a closed magnetic path part and a secondary magnetic path part. The bobbin is attached to the closed magnetic path part. The secondary magnetic path part extends from the closed magnetic path part in a direction intersecting with the axial direction, and it is positioned between the coils in the axial direction. The bobbin includes a gear. The gear is positioned between the coils in the axial direction.

Advantageous Effects of Invention

The gear of the bobbin is positioned between the coils wound on the bobbin in the axial direction. Partition plates provided on both sides of the secondary magnetic path part are also positioned between the coils in the axial direction. When viewed in a direction perpendicular to the axial direction, the gear overlaps with the partition plates at least in part. This eliminates the need for a space dedicated to the gear in the axial direction and thereby reducing a size of the compound line filter in the axial direction.

An appreciation of the objectives of the present invention and a more complete understanding of its structure may be had by studying the following description of the preferred embodiment and by referring to the accompanying drawings.

DESCRIPTION OF EMBODIMENTS

Figure 1:
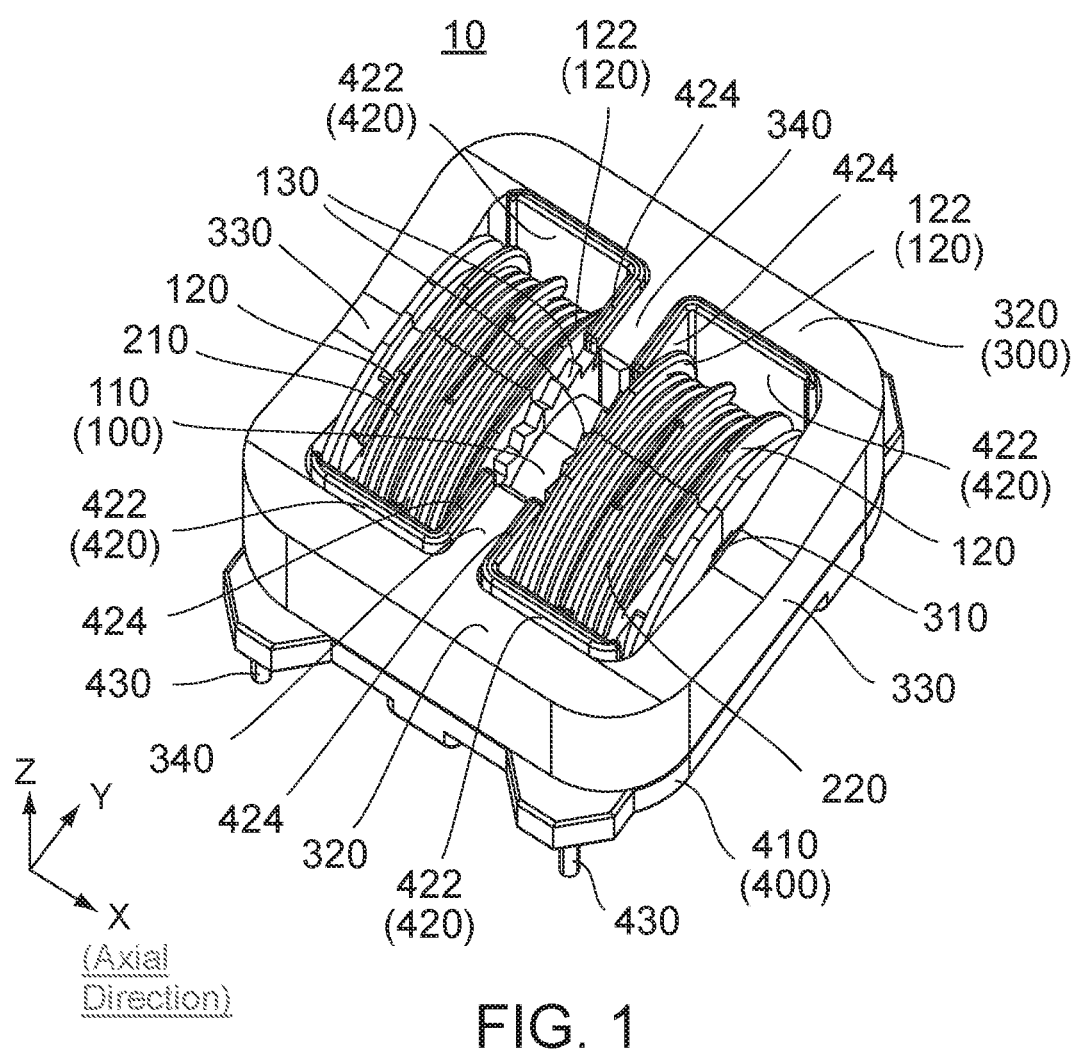
FIG. 1 is a perspective view showing a compound line filter according to a first embodiment of the present invention.

While the invention is susceptible of various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

First Embodiment

Referring to FIGS. 1 to 5, a compound line filter 10 according to a first embodiment of the present invention has a bobbin 100, two coils 210 and 220, a magnetic core 300 and a terminal mount 400. The coils 210 and 220 are wound on the bobbin 100. In detail, the coils 210 and 220 are wound on the bobbin 100 in a state of being separated from each other in an axial direction. The bobbin 100 is attached to a portion of a closed magnetic path part of the magnetic core 300 while the magnetic core 300 is attached to the terminal mount 400.

Figure 6:
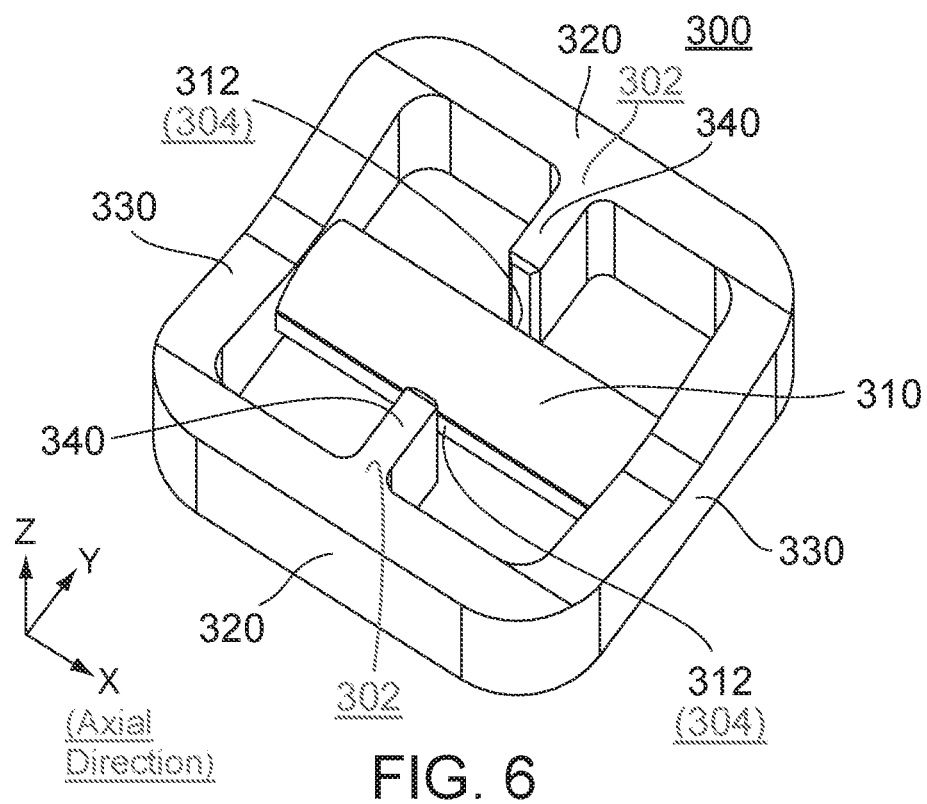
FIG. 6 is a perspective view showing a magnetic core included in the compound line filter of FIG. 1.
Figure 7:
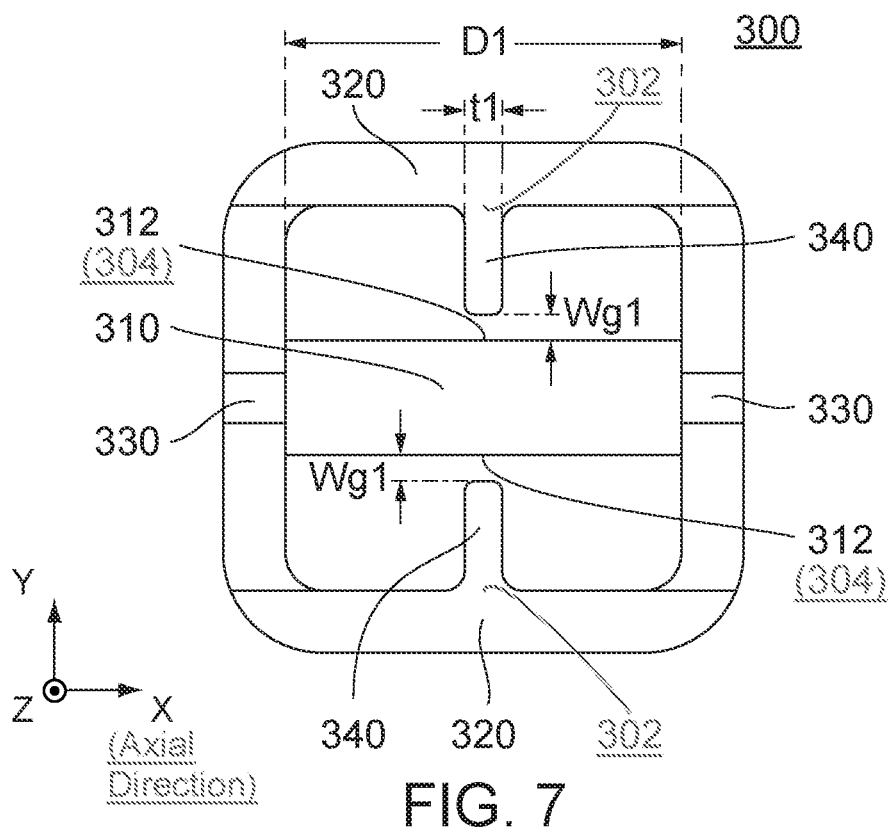
FIG. 7 is a plan view showing the magnetic core of FIG. 6.

As shown in FIGS. 6 and 7, the magnetic core 300 has a middle leg (a winding core part) 310, two outer legs 320, two coupling parts 330 and two protruding parts 340. In the present embodiment, the middle leg 310, the outer legs 320, the coupling parts 330 and the protruding parts 340 are formed in a single body. However, the present invention is not limited thereto. The magnetic core 300 may be formed by joining plural pieces together. Nevertheless, using the magnetic core 300 formed in a single body allows reduction of the number of pieces and the number of assembly steps and avoiding quality deterioration depending on assembly precision.

Figure 8:
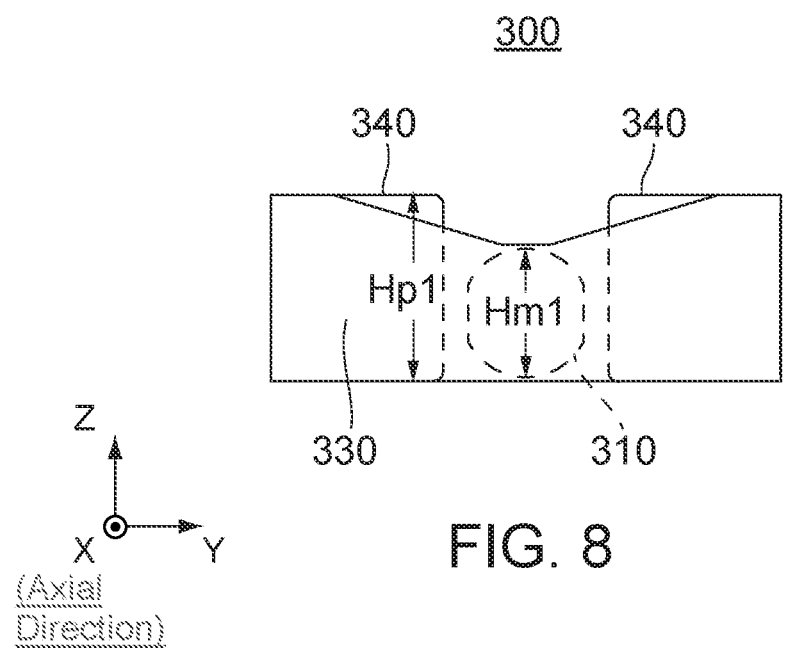
FIG. 8 is a right-side view showing the magnetic core of FIG. 6. By broken lines, portions of protruding parts and a middle leg which are hidden are shown.

As understood from FIG. 6, the middle leg 310 has an almost cylindrical shape (see FIGS. 3 and 8) and extends in a first direction (an X-direction, the axial direction). Each of the outer legs 320 has a flat quadrangular prism shape except for both end portions thereof, and it is disposed to be parallel to the middle leg 310 and extends in the X-direction. Each of the outer legs 320 and the middle leg 310 are separated from each other by a predetermined distance in a direction (Y-direction) perpendicular to the X-direction. Each of the coupling parts 330 has a quadrangular prism shape with a middle portion constricted and extends in the Y-direction. In other words, as shown in FIG. 8, the coupling part 330 has a shape in which a height thereof is the highest at each of end portions thereof and gradually decreases toward a middle portion thereof in the Y-direction. Moreover, a height Hp1 of the protruding parts 340 is higher than a height Hm1 of the middle leg 310. Additionally, a height direction is a Z-direction (a second direction) perpendicular to both of the X-direction (the first direction) and the Y-direction (parallel to projecting directions of the protruding parts 340). Accordingly, it can be also said that the size (the height Hp1) of the protruding parts 340 in the second direction is longer than the size (the height Hm1) of the middle leg 310 in the second direction. Thus, in the present invention, a size of secondary magnetic path parts (the protruding parts 340) is longer than a size of the winding core part (the middle leg 310) in the second direction perpendicular to both of the projecting direction and the first direction. With this, a sectional area of each of the secondary magnetic path parts becomes larger, magnetic saturation becomes harder to be happened, and desired normal mode inductance can be obtained.

As shown in FIGS. 6 and 7, the coupling parts 330 couple two of the outer legs 320 to both end portions of the middle leg 310, respectively. In detail, one of the coupling parts 330 couples one of end portions of each of the outer legs 320 and one of the end portions of the middle leg 310 to each other while the other of the coupling parts 330 couples the other of the end portions of each of the outer legs 320 and the other of the end portions of the middle leg 310 to each other. Thus, the coupling parts 330 and the outer legs 320 continue to one another to form a primary magnetic path part in which both ends of the middle leg 310 are connected to each other by two paths. Moreover, each of the outer legs 320 forms the closed magnetic path part together with the middle leg 310 and portions of the coupling parts 330. Additionally, a shape of the magnetic core 300 in which the middle leg 310, the outer legs 320 and the coupling parts 330 are coupled with one another as mentioned above is a shape of an angular figure eight when viewed along the Z-direction.

As understood from FIGS. 1, 2, 4, 6 and 7, each of the protruding parts 340 protrudes in a direction intersecting with the X-direction from a middle portion of each of the outer legs 320 in the X-direction. In the present embodiment, the protruding parts 340 protrude from the outer legs 320 toward the middle leg 310 along the Y-direction. Two of the protruding parts 340 protruding from two of the outer legs 320 protrude in opposite directions facing each other (in a positive Y-direction and a negative Y-direction). The protruding parts 340 form the secondary magnetic path parts by protruding from the outer legs 320 toward the middle leg 310. In this way, the secondary magnetic path parts extend from portions of the closed magnetic path parts in directions intersecting with the axial direction (the X-direction). Moreover, the secondary magnetic path parts are positioned between the coils 210 and 220 in the axial direction. The middle leg 310 has an opposition part 312 opposite to a tip of each of the protruding parts 340. A predetermined gap (clearance) is provided between the tip of the protruding part 340 and the opposition part 312 of the middle leg 310. Additionally, in the present embodiment, a portion opposite to the middle leg 310 among the middle portion of each of the outer legs 320 in the X-direction is a first portion 302 of the closed magnetic path portion. Moreover, a portion opposite to each of the outer legs 320 among the middle portion of the middle leg 310 in the X-direction is a second portion 304 of the closed magnetic path part. In this way, the first portion 302 of the closed magnetic path part is positioned between one end portions of the coils 210 and 220 while the second portion 304 of the closed magnetic path part is positioned between the other end portions of the coils 210 and 220. In the present embodiment, each of the secondary magnetic path parts protrudes from the first portion 302 toward the second portion 304. However, the present invention is not limited thereto. In the present invention, the secondary magnetic path part may be positioned between the coils 210 and 220 in the axial direction and protrude from a portion of one of the winding core part and the primary magnetic path part toward the opposition part of the remaining one of them in a direction intersecting with the axial direction. In other words, the secondary magnetic path part may be positioned between the first portion 302 and the second portion 304 and protrude from at least one of the first portion 302 and the second portion 304 toward the other.

Figure 11:
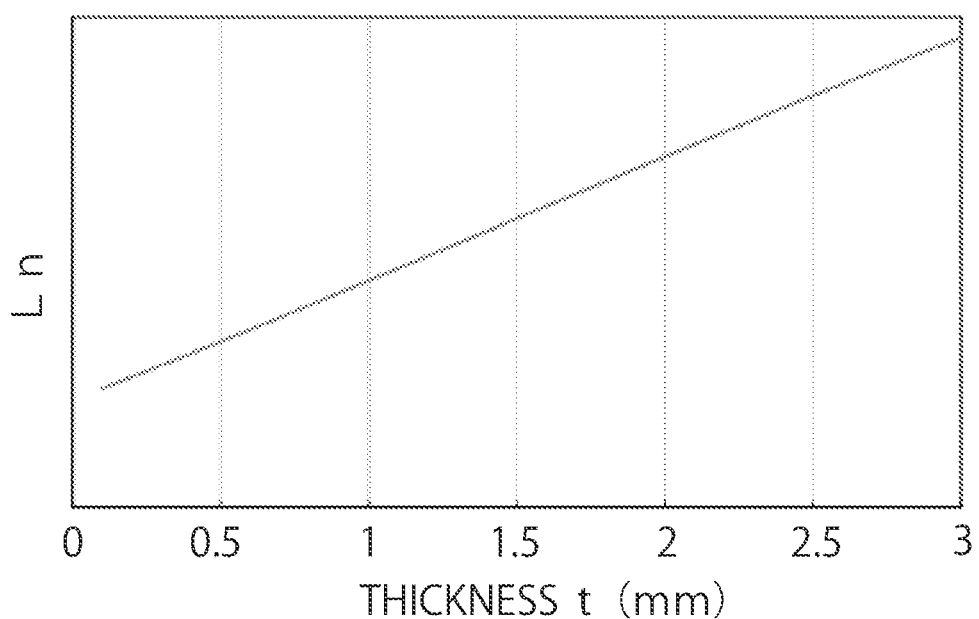
FIG. 11 is a graph showing relationship between thickness of the protruding part and normal mode inductance.

As shown in FIG. 7, the protruding parts 340 have a thickness t1. The thickness t1 of the protruding parts 340 is, as understood from FIG. 1, a size in a direction (the X-direction) parallel to a plane including axes of the coils 210 and 220 and perpendicular to the projecting direction. In the present embodiment, the thickness t1 of the protruding parts 340 is set to 0.5 mm or more. In other words, a lower limit of the thickness t1 of the protruding parts 340 is 0.5 mm. As understood from FIG. 11, this is because the thickness t1 of the protruding parts 340 and a normal mode inductance Ln in a normal mode are in a proportional relationship, and a required normal mode inductance Ln cannot be obtained when the thickness t1 is less than 0.5 mm. This is caused by reduction of an induction coefficient AL of the magnetic core 300 with reduction of the thickness t1 of the protruding parts 340. Though it is possible to increase the normal mode inductance Ln by increasing winding numbers of the coils 210 and 220 against reduction of the induction coefficient AL, in such a case, a resistance Rdc is increased. In addition, when the thickness t1 of the protruding parts 340 is reduced, magnetic saturation becomes easy to be caused.

Furthermore, in the present embodiment, the thickness t1 of the protruding parts 340 is set to D1/2 mm or less. In other words, an upper limit of the thickness t1 of the protruding parts 340 is D1/2 mm. Here, D1 is, as shown in FIG. 7, an internal measurement of the closed magnetic path part in the X-direction perpendicular to the projecting directions of the protruding parts 340. When an external form size of the magnetic core 300 is prescribed, increase of the thickness t1 of the protruding parts 340 means reduction of a space for winding the coils 210 and 220 or reduction of the winding number N of the coils 210 and 220. Because the normal mode inductance Ln is in proportion to a square of the winding number N of the coils 210 and 220, reduction of the winding number N significantly affects the normal mode inductance Ln. Accordingly, the thickness t1 of the protruding parts 340 is necessary to be D1/2 mm or less. However, the present invention is not limited thereto. According to a shape of a magnetic core, there is a case where an internal diameter is adopted in place of the internal measurement. That is, in the present invention, the upper limit of the size of the secondary magnetic path parts in the first direction may be D/2 mm, provided that the internal measurement or the internal diameter of the closed magnetic path part in the first direction is D mm. It is more preferable that the thickness t1 of the protruding parts 340 is 3.0 mm or less.

Figure 12:
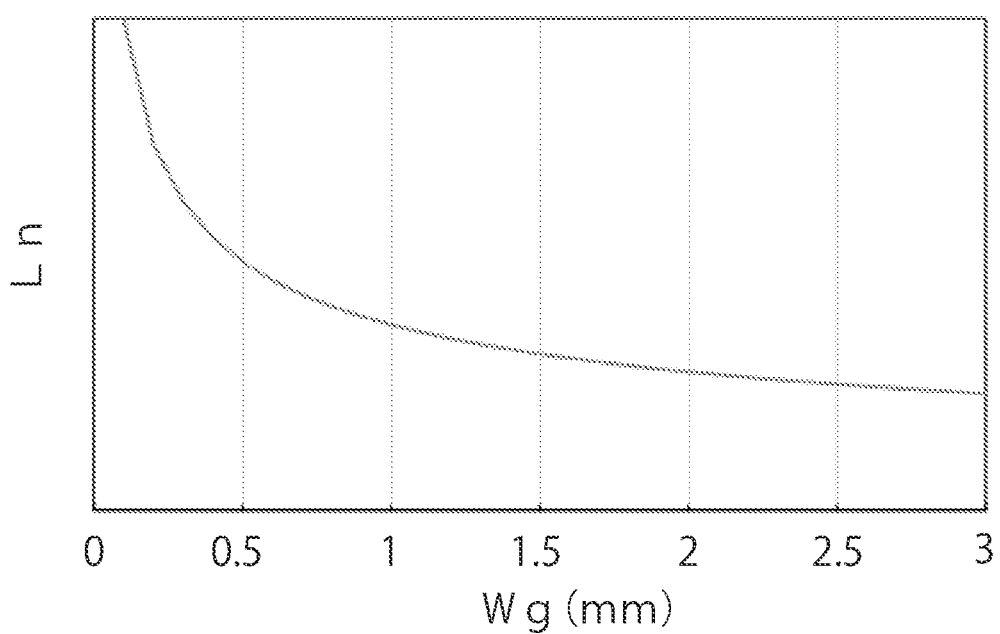
FIG. 12 is a graph showing relationship between gap width and the normal mode inductance.

Moreover, in the present embodiment, an interval (or a gap width) Wg1 (see FIG. 7) between each of the protruding parts 340 and the opposition part 312 may be not zero but shorter than a distance from the opposition part 312 to a base (the first portion 302) of the protruding part 340. The gap width Wg1 is set according to materials of the magnetic core 300 and desired normal mode characteristics. For example, the gap width Wg1 may be set to 0.1 mm or more and 2.0 mm or less. In this case, the lower limit of the gap width Wg1 is 0.1 mm while the upper limit thereof is 2.0 mm. Thus, in the present invention, the lower limit of the distance between the secondary magnetic path part (the protruding part 340) and the opposition part (the middle leg 310) can be set to 0.1 mm, and the upper limit thereof can be set to 2.0 mm. Reasons for limiting the gap width Wg1 in this way are the followings. That is, this is because reduction of the gap width Wg1 increases leak magnetic flux and causes magnetic saturation, and thereby deteriorating DC superimposing characteristics. In addition, as understood from FIG. 12, it is because that the required normal mode inductance Ln cannot be obtained when the gap width Wg1 becomes too wide.

As mentioned above, in the compound line filter 10 according to the present embodiment, the secondary magnetic path part (the protruding part 340) is formed to protrude from the first portion 302 and the second portion 304 of the closed magnetic path part (the middle leg 310 and the outer leg 320). Therefore, in comparison with a case of combining two pieces, variation of a size can be suppressed, and variation of characteristics can be suppressed. Moreover, since the variation of the size is suppressed, it becomes easy to contain the thickness t1 of the protruding parts 340 and the gap width Wg1 within predetermined ranges, respectively. Furthermore, since the thickness t1 of the protruding parts 340 and the gap width Wg1 can be contained within the predetermined ranges, respectively, characteristics including the normal mode inductance Ln can be improved.

Though the protruding parts 340 protrude from the outer legs 320 toward the middle leg 310 in the present embodiment, the protruding parts 340 may be formed to protrude from the middle leg 310 toward the outer legs 320. However, a degree of flexibility in design for a thickness of the outer legs 320 is higher than that in design for a thickness of the middle leg 310. Accordingly, providing the protruding parts 340 on the outer legs 320 has an advantage of being able to enlarge a protruding size of the protruding parts 340. Moreover, in a case where the protruding parts 340 are provided on the middle leg 310, the bobbin 100 cannot rotate if it is not divided into two in the axis direction, and hence increase of the number of pieces is caused.

Figure 9:
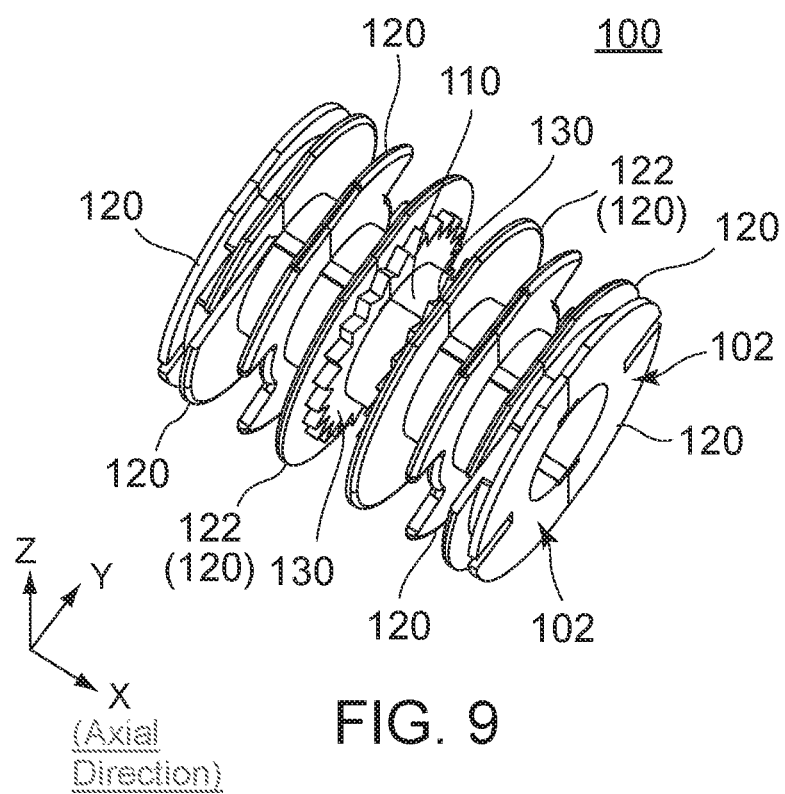
FIG. 9 is a perspective view showing a bobbin included in the compound line filter of FIG. 1.

As shown in FIG. 9, the bobbin 100 has a cylindrical part 110, a plurality of flange parts 120 and two gears 130. The cylindrical part 110 has a central axis extending in the first direction (the X-direction or the axial direction). The coils 210 and 220 are wound on an external peripheral surface of the cylindrical part 110, and thereby the axis of the coil 210, 220 coincides with the central axis of the cylindrical part 110. The flange parts 120 extend outward from the external peripheral surface of the cylindrical part 110 in radial directions perpendicular to the central axis. The flange parts 120 are formed with some notches according to their objects. As understood from FIGS. 1, 2 and 4, six of the flange parts 120 positioned to the middle in the X-direction define positions of the coils 210 and 220 wound on the cylindrical part 110 in the X-direction. In particular, two of the flange parts 120 positioned at the innermost positions in the X-direction, i.e., inner flanges 122, define a distance between the coils 210 and 220 in the X-direction.

As shown in FIG. 9, two of the gears 130 are formed on surfaces of the inner flanges 122, wherein the surfaces are opposite to each other. In other words, the gears 130 are positioned between the inner flanges 122 in the X-direction. Two of the gears 130 have the same shape, and they are disposed to be plane symmetry with respect to a plane perpendicular to the X-axis. As understood from FIGS. 1, 2 and 4, in the state that the coils 210 and 220 are wound on the bobbin 100, the gears 130 are positioned between the coils 210 and 220.

As understood from FIG. 9, the bobbin 100 consists of two winding frame pieces 102. Each of the winding frame pieces 102 is approximately equal to a half of the bobbin 100 divided into two by a plane including the central axis. Two of the winding frame pieces 102 may be formed in the same shape or include different shape portions. At any rate, each of the winding frame pieces 102 includes a portion of the cylindrical part 110, wherein the portion has a half-pipe shape. By combining and fixing these winding frame pieces 102 to each other to sandwich the middle leg 310 of the magnetic core 300 between two of the winding frame pieces 102, the bobbin 100 is attached to the middle leg 310 of the magnetic core 300. The bobbin 100 is rotatable around the middle leg 310 in the state that it is attached to the middle leg 310.

Figure 4:
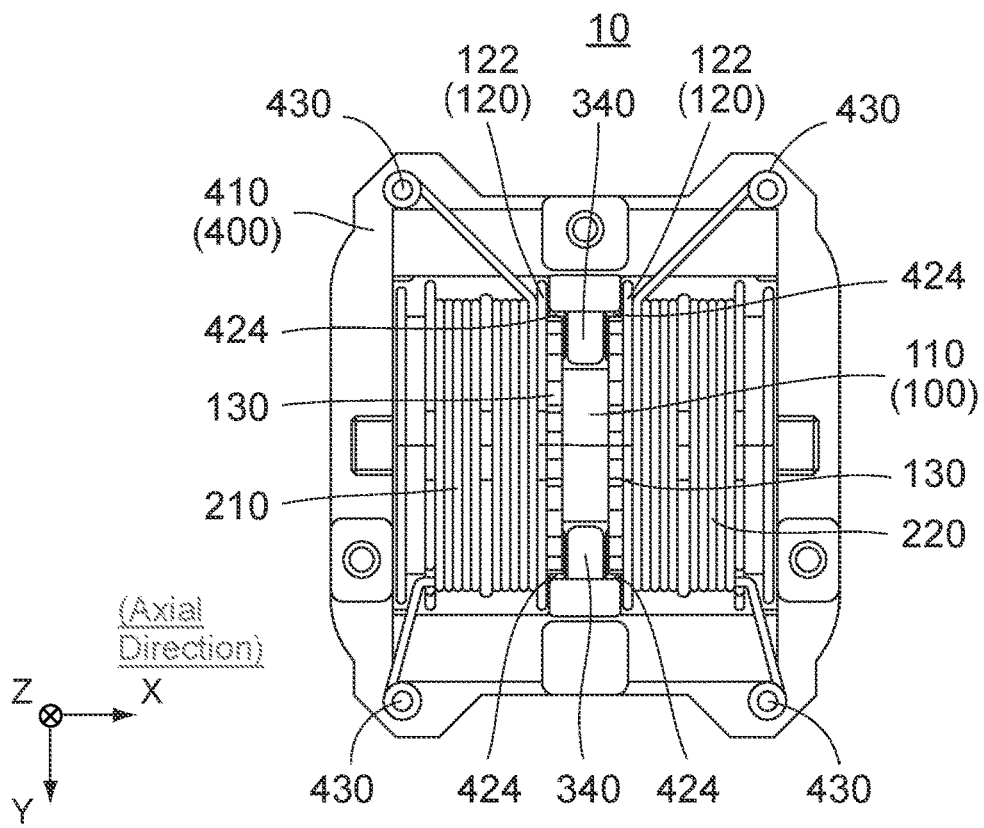
FIG. 4 is a bottom view showing the compound line filter of FIG. 1.
Figure 5:
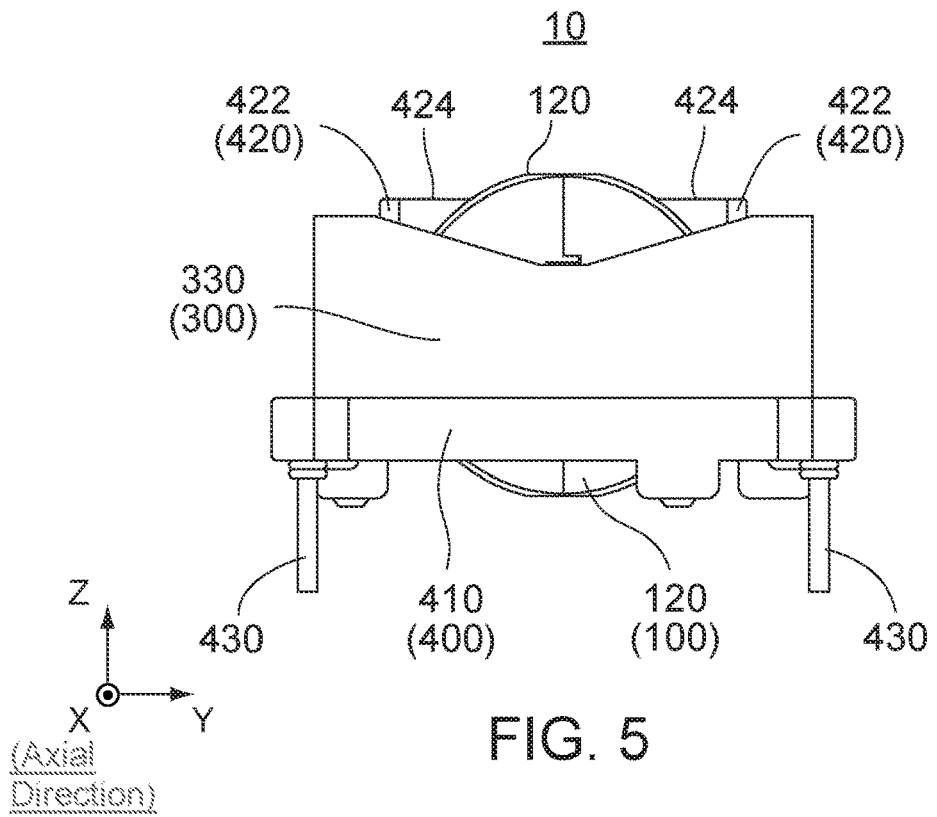
FIG. 5 is a right-side view showing the compound line filter of FIG. 1.
Figure 10:
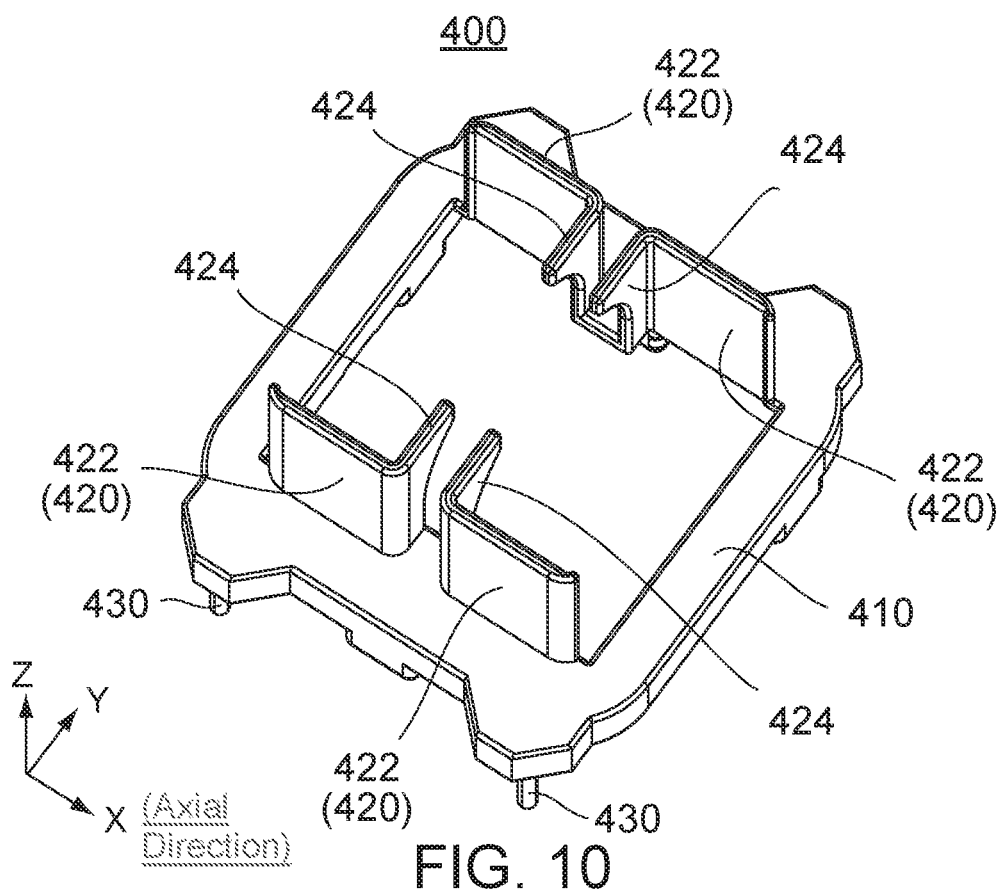
FIG. 10 is a perspective view showing a terminal mount included in the compound line filter of FIG. 1.

Referring to FIG. 10, the terminal mount 400 has a base part 410, two pairs of wall parts 420 and two pairs of pins 430 (see FIG. 4). Each of the wall parts 420 has a main part 422 and a partition plate 424. Thus, in the present embodiment, the partition plate 424 is a portion of the terminal mount 400. The base part 410 has a shape of a roughly rectangle frame. The wall parts 420 are provided along two inner edges of the base part 410, wherein the inner edges are opposite to each other in the Y-direction, and protrude upward (in a positive Z-direction) from the base part 410. In detail, the main parts 422 of the wall parts 420 are formed along the inner edges of the base part 410. The main parts 422 of the wall parts 420 forming a pair are formed to the inner edges of the base part 410, wherein the inner edges are different from each other, and are opposite to each other in the Y-direction. The main parts 422 arranged in the X-direction belong to different pairs of the wall parts 420. The main parts 422 arranged in the X-direction are apart from each other by a predetermined direction. The partition plates 424 are provided to inner end portions of two of the main parts 422 arranged in the X-direction, respectively, wherein the inner end portions are located inward in the X-direction. The partition plates 424 of the wall parts 420 forming a pair protrude along the Y-direction to face each other. The base part 410 and the wall parts 420 may be integrally molded using a resin. The pins 430 are provided to the vicinities of four corners of the base part 410 and protrude downward (in the negative Z-direction) from the base part 410. The pins 430 forming a pair are arranged in the Y-direction. The pins 430 are made of metal, and they may be integrally molded with the base part 410 and the wall parts 420 by insert molding. As shown in FIG. 4, end portions of windings forming the coils 210 and 220 are wound on and connected to the pins 430. The end portions of the winding of each of the coils 210 and 220 are connected to the pins 430 forming the pair, respectively.

The compound line filter 10 of the present embodiment may be fabricated by the following steps in outline. At first, the bobbin 100 of FIG. 9 is attached to the magnetic core 300 of FIG. 6. Next, the magnetic core 300 to which the bobbin 100 is attached is attached to the terminal mount 400 of FIG. 10. Next, the windings of the coils 210 and 220 are wound on the bobbin 100, and the end portions of them are fixed (connected) to the pins 430 of the terminal mount 400. In this manner, the compound line filter 10 is completed.

In the step in which the windings of the coils 210 and 220 are wound on the bobbin 100, the gears 130 are used. In detail, gear tooth (not shown) of a driving gear driven by an unillustrated driving motor or the like are engaged with gear tooth of the gears 130 to rotate the bobbin 100 about the middle leg 310 as an axis. In the present embodiment, two of the gears 130 are driven by a single of the driving gear. In detail, a teeth width (a thickness in the X-direction) of each of two of the gears 130 is considerably narrower than a teeth width of the driving gear. Moreover, two of the gears 130 are disposed to engage with the driving gear at both end portions in a teeth width direction (the X-direction) of the driving gear. With this structure, driving stability and reliability equal to those in a case where a gear having a teeth width corresponding to (almost the same size as that of) the teeth width of the driving gear is provided to the bobbin 100 can be obtained. Note that the number of the gear 130 may be one if enough strength is secured on the gear 130.

Figure 2:
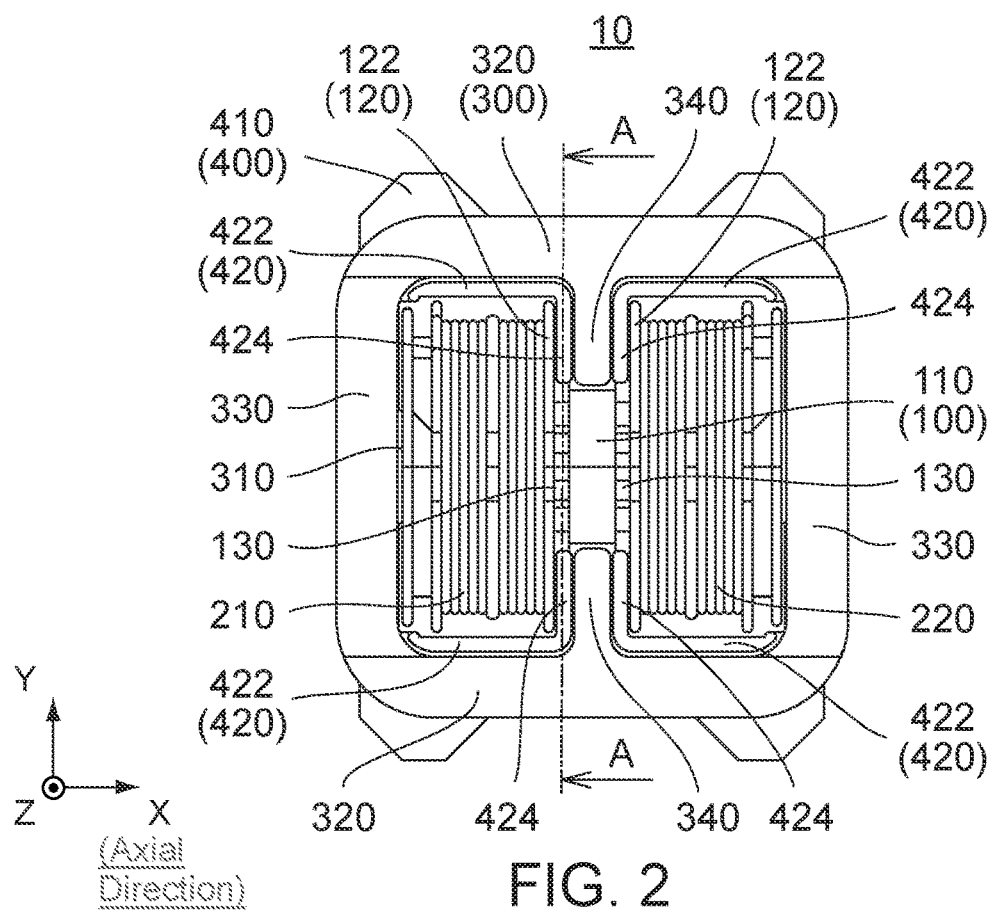
FIG. 2 is a plan view showing the compound line filter of FIG. 1.
Figure 3:
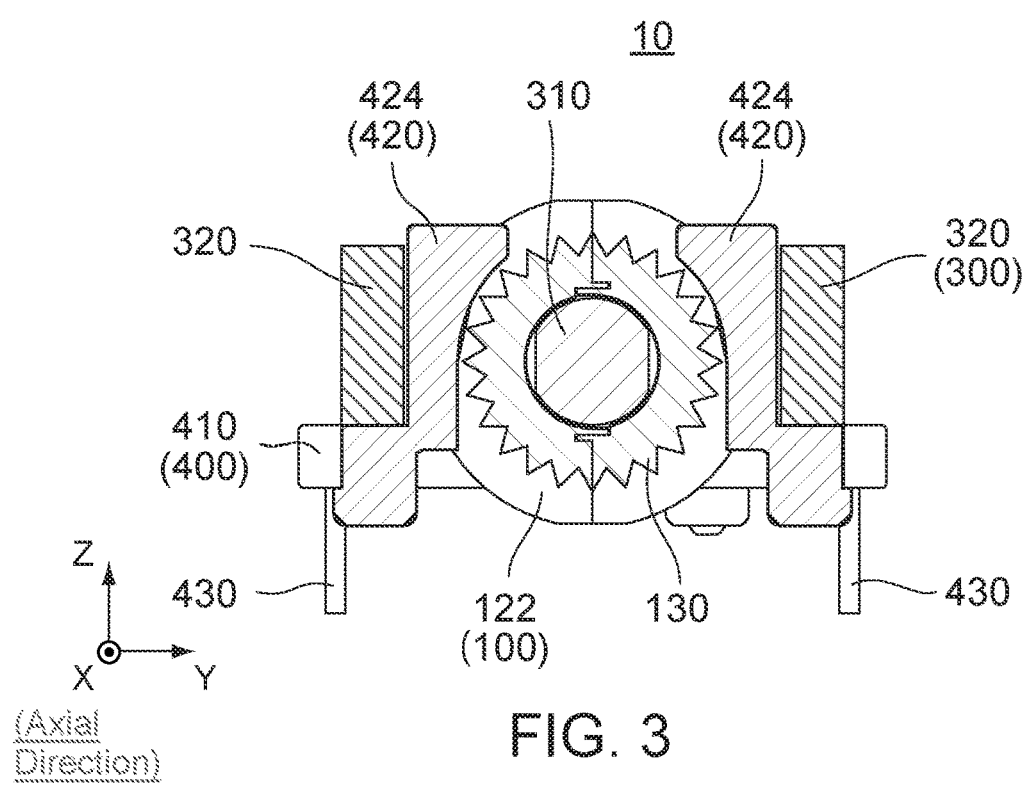
FIG. 3 is a cross-sectional view showing the compound line filter of FIG. 2, taken along A-A line. However, coils are omitted.

As understood from FIG. 9, there is nothing between two of the gears 130 in the bobbin 100 alone. On the other hand, as shown in FIGS. 1, 2 and 4, in a state that the bobbin 100 is attached to the magnetic core 300, the protruding parts 340 are disposed between the gears 130. That is, in the present embodiment, not only the gears 130 to be engaged with the driving gear but also the protruding parts 340 are provided within a range corresponding to the teeth width of the driving gear (not shown) in the X-direction. With this, in the present embodiment, a size in the axial direction can be reduced in comparison with the case where the gear having the teeth width corresponding to the teeth width of the driving gear is attached to the bobbin 100.

As understood from FIGS. 1 to 4, in the present embodiment, when viewed along the X-direction, the gears 130 and the protruding parts 340 overlap with one another. That is, a diameter of the gears 130 is never limited by existence of the protruding parts 340. Then, enlarging the diameter of the gears 130 allows the windings to be tightly wound even by a small driving force. Moreover, since the windings are wound by the small driving force, strength necessary to the gears 130 is also small.

Referring to FIGS. 1, 2 and 4, the protruding parts 340 are positioned between the coils 210 and 220 and between the gears 130 in the X-direction. Moreover, each of the protruding parts 340 is positioned between a portion of each of the outer legs 320 and the opposition part 312 (see FIG. 6) of the middle leg 310 in the Y-direction. The partition plates 424 are provided on both sides of the protruding parts 340 and positioned between the coils 210 and 220 in the X-direction. The gears 130 are also positioned between the coils 210 and 220 in the X-direction. Moreover, the gears 130 are positioned outward of the protruding parts 340 in the X-direction. In other words, each of the gears 130 is positioned between the protruding parts 340 and one of the inner flanges 122 in the X-direction. Then, the gears 130 overlap with the partition plates 424 at least in part when viewed along the Y-direction. Here, each of the partition plates 424 is for securing a required isolation distance (a creepage distance) between each of the coils 210 and 220 and the protruding part 340, and it is necessary and essential. At least portions of the gears 130 are disposed to overlap with these partition plates 424. Accordingly, specific spaces for providing these portions are unnecessary in the X-direction. In the present embodiment, the greater parts of the gears 130 overlap with the partition plates 424, and specific spaces for disposition of the gears 130 are almost no need. Therefore, in the present embodiment, the size in the axial direction can be reduced in comparison with the line filter of Patent Document 1 in which the gear is provided on one of the outer flange parts.

Second Embodiment

Referring to FIGS. 13 to 17, a compound line filter 10A according to a second embodiment of the present invention has a structure like that one of the outer legs 320 and portions of the coupling parts 330 are removed from the magnetic core 300 in the compound line filter 10 according to the first embodiment. Hereinafter, the description will be made about different points of the compound line filter 10A which differ from the compound line filter 10.

Figure 18:
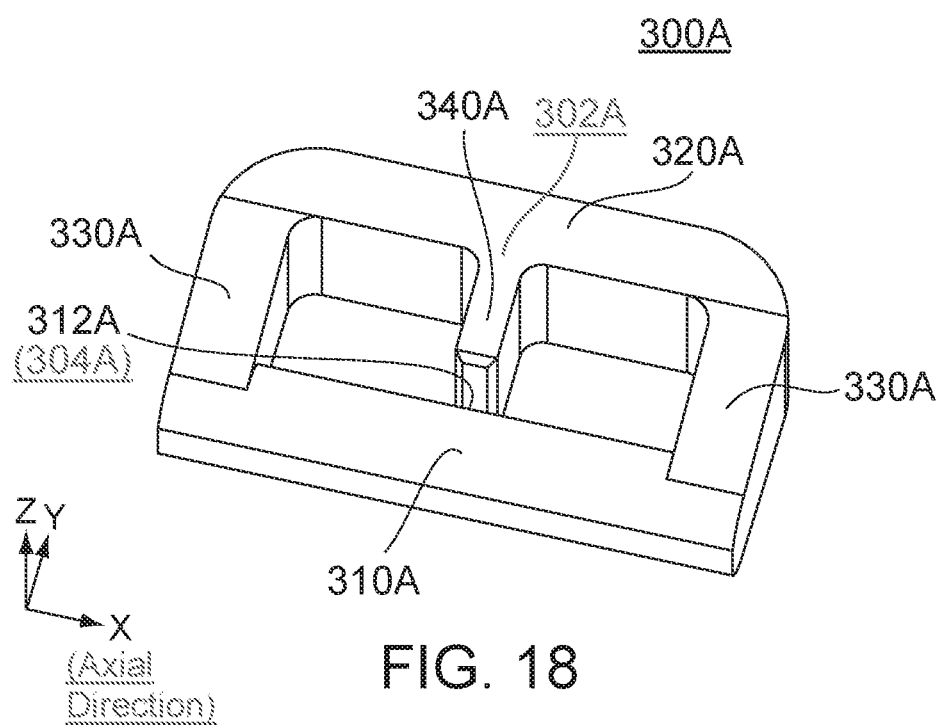
FIG. 18 is a perspective view showing a magnetic core included in the compound line filter of FIG. 13.
Figure 19:
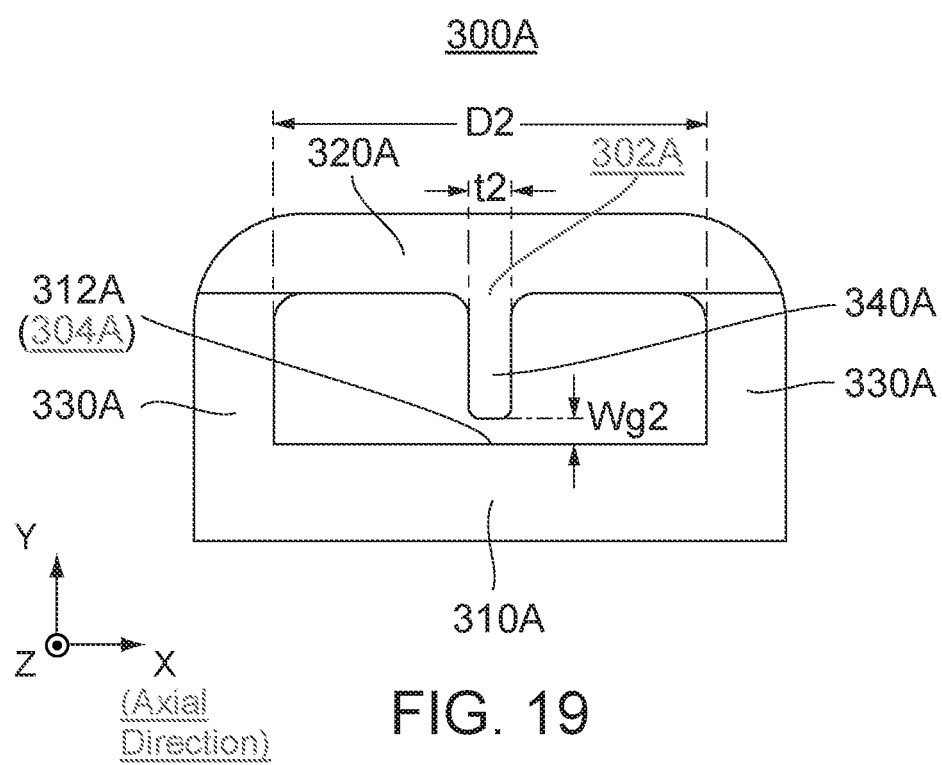
FIG. 19 is a plan view showing the magnetic core of FIG. 18.
Figure 20:
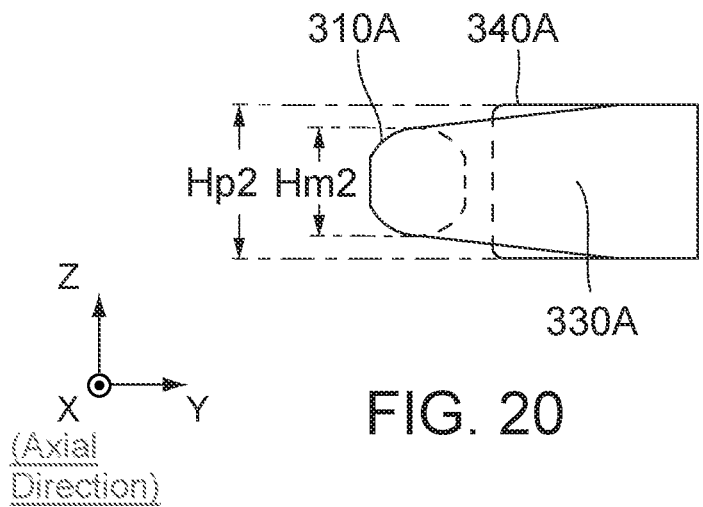
FIG. 20 is a right-side view showing the magnetic core of FIG. 18. By broken lines, portions of protruding parts and a middle leg which are hidden are shown.

A magnetic core 300A of the compound line filter 10A according to the present embodiment has, as shown in FIGS. 18 and 19, a middle leg (a winding core part) 310A, a single outer leg 320A, two coupling parts 330A and a single protruding part 340A. The coupling parts 330A and the outer leg 320A continue to one another, and they couple both ends of the middle leg 310A to form a primary magnetic path part. Moreover, the middle leg 310A, the outer leg 320A and the coupling parts 330A form a closed magnetic path part. A shape of the magnetic core 300A in which the middle leg 310A, the outer leg 320A and the coupling parts 330A are coupled with one another like this is a rectangular frame shape when viewed along the Z-direction. The protruding part 340A protrudes in the Y-direction from a middle portion of the outer leg 320A in the X-direction toward the middle leg 310A. In the same way as the first embodiment, a predetermined gap (clearance) is provided between a tip of the protruding part 340A and an opposition part 312A of the middle leg 310A, a portion opposite to the middle leg 310A among the middle portion of the outer leg 320A in the X-direction is a first portion 302A, and a portion opposite to the outer leg 320A among a middle portion of the middle leg 310A in the X-direction is a second portion 304A. In the present embodiment, the magnetic core 300A is formed, as understood from FIG. 20, in a symmetrical shape in an up-down direction.

As shown in FIG. 19, the protruding part 340A has a thickness t2 as a size in the X-direction. The thickness t2 may be set to 0.5 mm or more and D2/2 mm or less like the thickness t1 of the first embodiment, wherein D2 is an internal measurement of the closed magnetic path part in the X-direction. Moreover, a distance (gap width) Wg2 between the protruding part 340A and the opposition part 312A may be set to 0.1 mm or more and 2.0 mm or less. Both are for the reasons similar to those of the first embodiment. In the present embodiment too, since the thickness t2 of the protruding part 340A and the gap width Wg2 are contained within predetermined ranges, respectively, characteristics including the normal mode inductance Ln are improved.

Figure 16:
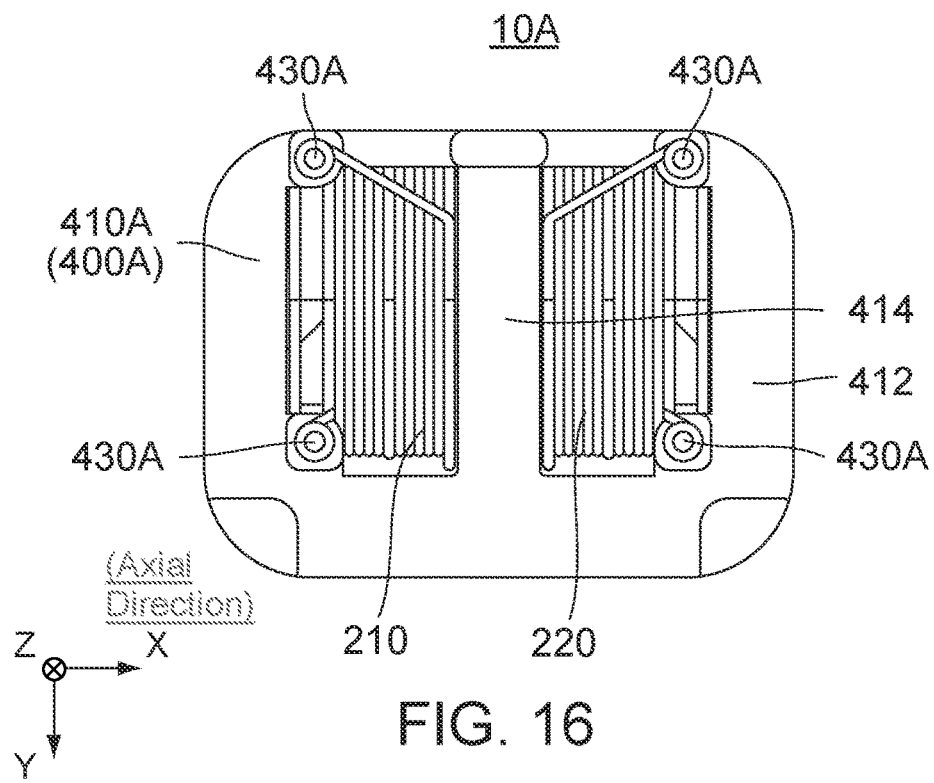
FIG. 16 is a bottom view showing the compound line filter of FIG. 13.
Figure 17:
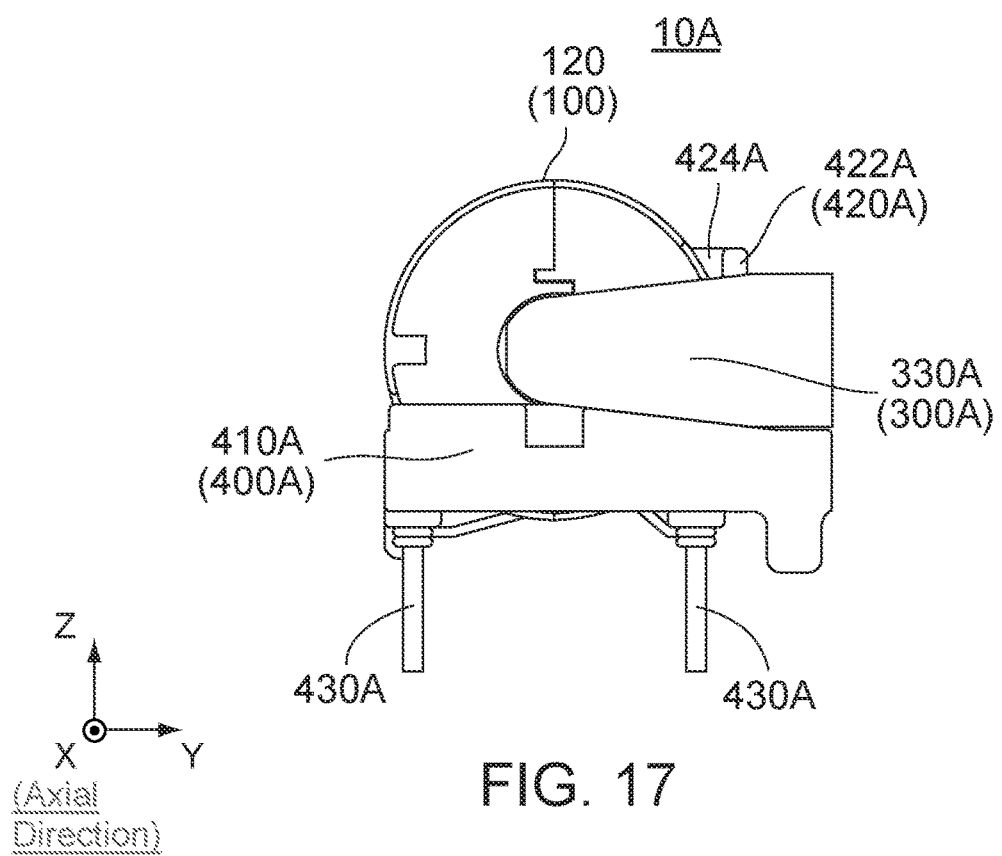
FIG. 17 is a right-side view showing the compound line filter of FIG. 13.
Figure 21:
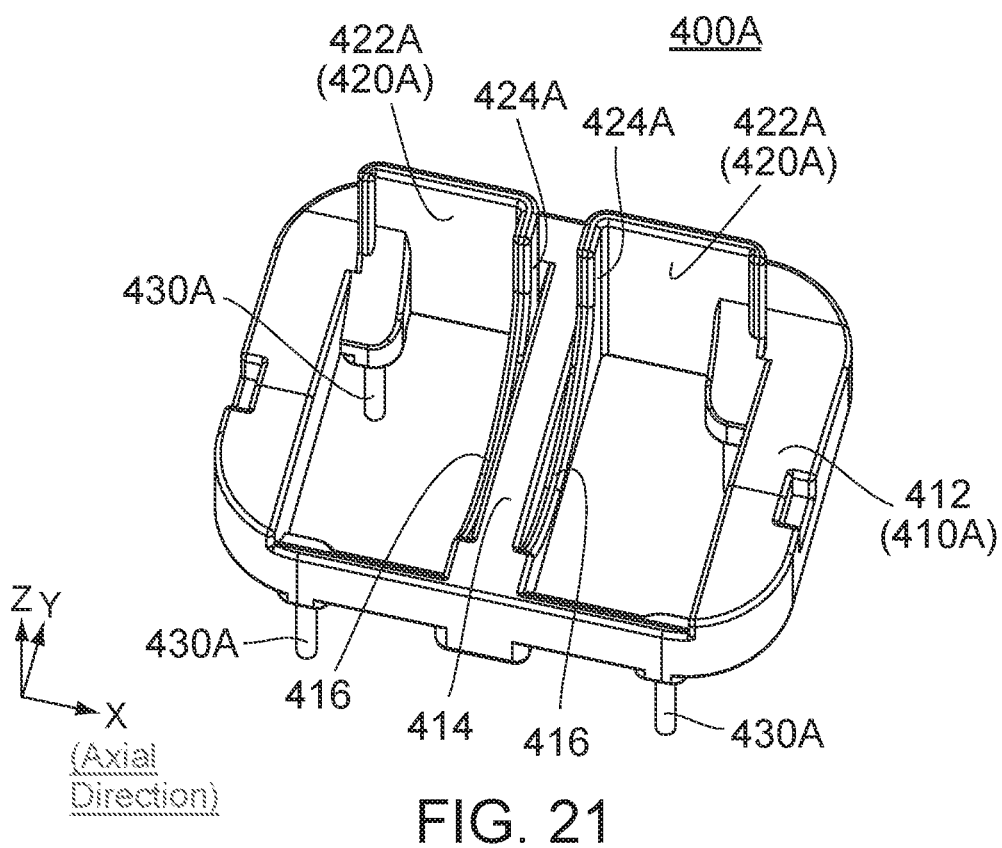
FIG. 21 is a perspective view showing a terminal mount included in the compound line filter of FIG. 13.

Referring to FIG. 21, a terminal mount 400A has a base part 410A, two wall parts 420A and two pairs of pins 430A (see FIG. 16). Each of the wall parts 420A has a main part 422A and a partition plate 424A. The base part 410A has a frame part 412 with an approximately rectangular shape and a beam part 414 provided in the middle of the frame part 412. A portion of an upper surface of the frame part 412 is sloped, as shown in FIG. 17, to correspond to a shape of the magnetic core 300A. Moreover, as shown in FIG. 21, the beam part 414 is formed with recesses 416 to accommodate portions of the gears 130 (see FIGS. 9 and 13) of the bobbin 100. Each of the wall parts 420A is provided along one of two inner edges of the base part 410A, wherein the inner edges are opposite to each other in the Y-direction. The main parts 422A of two of the wall parts 420A are arranged in the X-direction to sandwich the beam part 414 and protrude upward (in the positive Z-direction) from the base part 410A. Moreover, the partition plates 424A of two of the wall parts 420A protrude along the Y-direction from inner end portions of two of the main parts 422, wherein the inner end portions are located inward in the X-direction. The pins 430A are provided in positions apart from four corners of the base part 410A a little.

Figure 13:
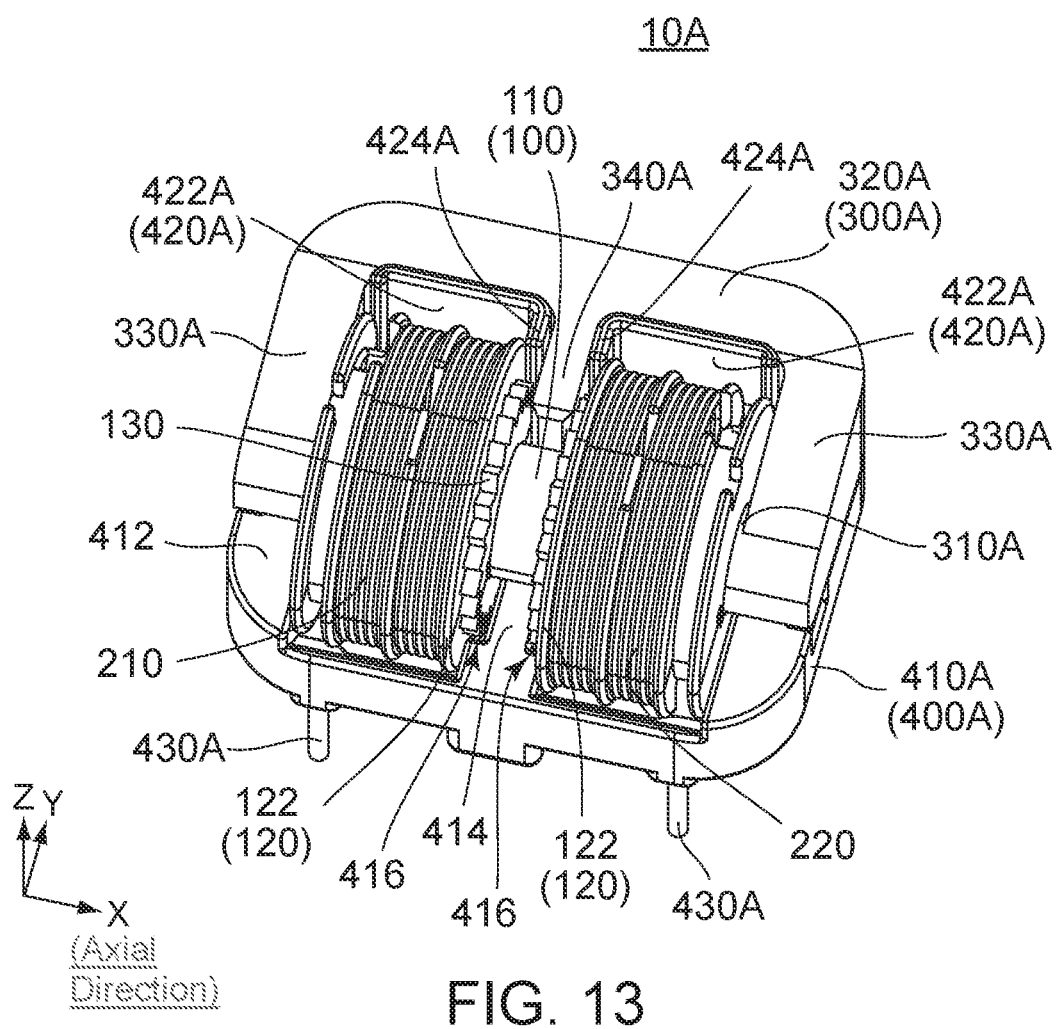
FIG. 13 is a perspective view showing a compound line filter according to a second embodiment of the present invention.
Figure 14:
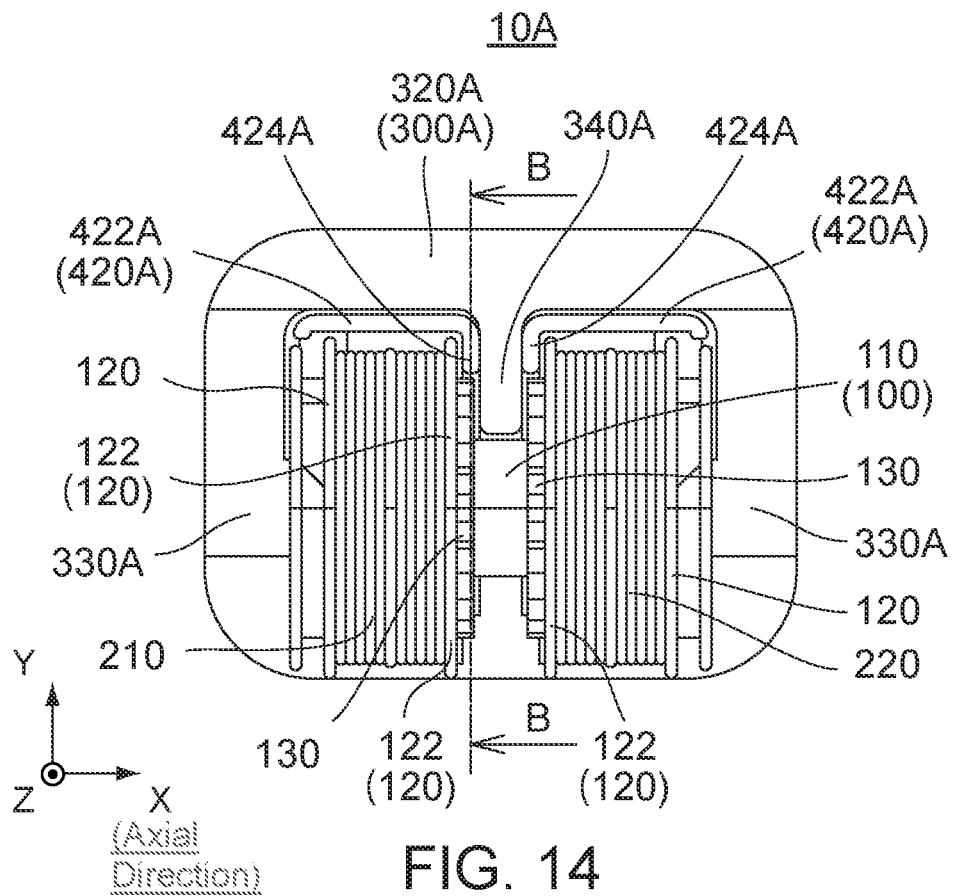
FIG. 14 is a plan view showing the compound line filter of FIG. 13.

In the present embodiment too, using the bobbin 100 shown in FIG. 9 and disposing the protruding part 340A between the gears 130 as shown in FIGS. 13 and 14 allow reduction of a size in the axial direction in comparison with the case where the gear with the teeth width corresponding to that of the driving gear is provided to the bobbin 100.

Figure 15:
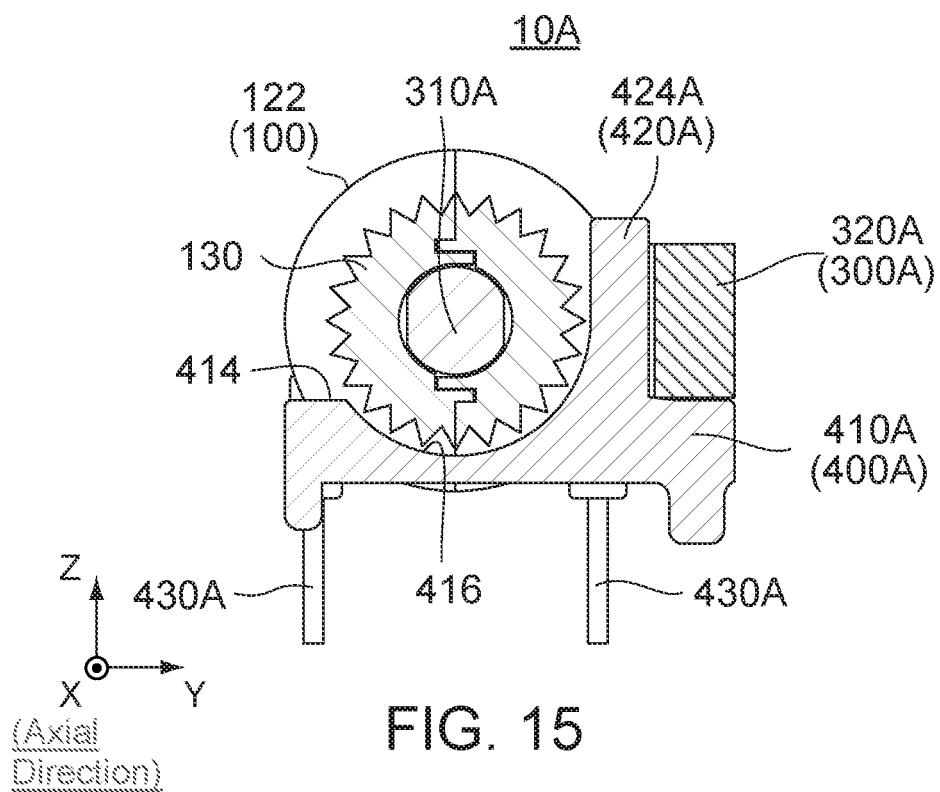
FIG. 15 is a cross-sectional view showing the compound line filter of FIG. 13, taken along B-B line. However, coils are omitted.

Moreover, in the present embodiment too, as understood from FIGS. 13 to 15, when viewed along the X-direction, the gears 130 and the protruding part 340A overlap with one another. Therefore, the diameter of the gears 130 is not limited by existence of the protruding part 340A. Then, enlarging the diameter of the gears 130 allows the windings to be tightly wound even by a smaller driving force.

In addition, as understood from FIGS. 13 and 14, in the present embodiment too, the protruding part 340A is positioned between the coils 210 and 220 and between the gears 130 in the X-direction. Furthermore, the protruding part 340A is positioned between a portion of the outer leg 320A and the opposition part 312A of the middle leg 310A in the Y-direction. The partition plates 424A are provided on both sides of the protruding part 340A and positioned between the coils 210 and 220 in the X-direction. The gears 130 are also positioned between the coils 210 and 220 in the X-direction. In other words, each of the gears 130 is positioned between the protruding part 340A and one of the inner flanges 122 in the X-direction. Then, the gears 130 overlap with the partition plate 424A at least in part when viewed along the Y-direction. In the present embodiment too, similar to the first embodiment, at least portions of the gears 130 overlap with the partition plates 424A. Accordingly, special spaces for providing these portions are unnecessary in the X-direction. Therefore, the compound line filter 10A according to the present embodiment can reduce the size in the axial direction in comparison with the line filter of Patent Document 1 in which the gear is provided to the outer flange part.

Although the specific explanation about the present invention is made above referring to the embodiments, the present invention is not limited thereto but susceptible of various modifications and alternative forms. For example, though the magnetic core 300 or 300A which is formed in a single body is used in the aforementioned embodiments, the magnetic core 300 or 300A may be formed by combining core pieces not to form a gap. Moreover, provided that the magnetic core 300 or 300A has predetermined characteristics, a shape thereof may be changed.

The present invention is based on Japanese patent applications of JP2016-124759 filed with the Japan Patent Office on Jun. 23, 2016, and of JP2016-125887 filed with the Japan Patent Office on Jun. 24, 2016, the content of which is incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST 10, 10A compound line filter
100 bobbin
102 winding frame piece
110 cylindrical part
120 flange part
122 inner flange
130 gear
210, 220 coil
300, 300A magnetic core
310, 310A middle leg (winding core part)
312, 312A opposition part
320, 320A outer leg
330, 330A coupling part
340, 340A protruding part
400, 400A terminal mount
410, 410A base part
412 frame part
414 beam part
416 recess
420, 420A wall part
422, 422A main part
424, 424A partition plate
430, 430A pin

The invention claimed is:

1. A compound line filter comprising a single bobbin, two coils, two partition plates, and a magnetic core, wherein:
the coils are wound on the single bobbin in a state of being separated from each other in an axial direction;
the magnetic core comprises a closed magnetic path part and a secondary magnetic path part;
the single bobbin is attached to the closed magnetic path part;
the secondary magnetic path part extends from the closed magnetic path part in a direction intersecting with the axial direction and is positioned between the coils in the axial direction;
the single bobbin comprises two gears;
the gears are positioned between the coils in the axial direction;
the closed magnetic path part comprises a winding core part extending in the axial direction and a primary magnetic path part coupling both ends of the winding core part to each other;
the single bobbin is attached to the winding core part;
the secondary magnetic path part is positioned between a portion of the primary magnetic path part and the winding core part in a direction perpendicular to the axial direction;
the partition plates are provided so as to be separated from each other in the axial direction;
the secondary magnetic path part is positioned between the partition plates in the axial direction;
the partition plates are positioned between the coils in the axial direction; and
the gears at least partially overlap with the partition plates when viewed from the direction perpendicular to the axial direction.

2. The compound line filter as recited in claim 1, wherein the gears and the secondary magnetic path part overlap with each other when viewed along the axial direction.

3. The compound line filter as recited in claim 2, wherein:
the single bobbin comprises a plurality of flanges to position the coils;
the flanges include two inner flanges positioned inward in the axial direction;
the gears are positioned between the inner flanges in the axial direction;
the secondary magnetic path part is positioned between the gears in the axial direction; and
the gears are opposite to each other when viewed along the axial direction.

4. The compound line filter as recited in claim 1, wherein:
the magnetic core is formed in a single body; and
the secondary magnetic path part extends from the primary magnetic path part toward the winding core part.

5. The compound line filter as recited in claim 1, wherein:
the compound line filter further comprises a terminal mount provided with pins to which end portions of windings of the coils are connected; and
the partition plates are portions of the terminal mount.

6. The compound line filter as recited in claim 1, wherein:
the secondary magnetic path part is positioned between a first portion of the closed magnetic path part and a second portion of the closed magnetic path part;
the first portion is positioned between end portions of the coils;
the secondary magnetic path part protrudes from one of the first portion and the second portion toward the other of the first portion and the second portion, and the other of the first portion and the second portion towards which the secondary magnetic path part protrudes comprises an opposition part;
a clearance is formed between a tip of the secondary magnetic path part and the opposition part to which the tip is opposite; and
a lower limit of a size of the secondary magnetic path part in a first direction perpendicular to a protruding direction in which the secondary magnetic path part protrudes is 0.5 mm.

7. The compound line filter as recited in claim 6, wherein:
the closed magnetic path part comprises a winding core part;
the secondary magnetic path part extends toward the winding core part;
the single bobbin is attached to the winding core part; and
in a second direction perpendicular to both of the protruding direction and the first direction, a size of the secondary magnetic path part is longer than a size of the winding core part.

8. The compound line filter as recited in claim 7, wherein:
the closed magnetic path part comprises a primary magnetic path part to couple both ends of the winding core part;
the winding core part comprises the opposition part;
the winding core part extends in the axial direction;
the secondary magnetic path part protrudes from the primary magnetic path part toward the opposition part; and
the protruding direction is a direction intersecting with the axial direction.

9. The compound line filter as recited in claim 6, wherein a lower limit of a distance between the secondary magnetic path part and the opposition part is 0.1 mm.

10. The compound line filter as recited in claim 6, wherein provided that an inner measurement or an inner diameter of the closed magnetic path part in the first direction is D mm, an upper limit of the size of the secondary magnetic path part in the first direction is D/2 mm.

11. The compound line filter as recited in claim 6, wherein an upper limit of a distance between the secondary magnetic path part and the opposition part is 2.0 mm.

* * * * *